US010909535B2

(12) United States Patent
Soundararajan

(10) Patent No.: US 10,909,535 B2
(45) Date of Patent: Feb. 2, 2021

(54) SYSTEM, METHOD, AND ARTICLE OF MANUFACTURE TO NON-INVASIVELY AUTHENTICATE AN AUTHORIZED USER OF A MOBILE DEVICE AND DISPLAYING A SCANNING CODE OVER A LOCK SCREEN WALLPAPER OF THE MOBILE DEVICE

(71) Applicant: AVANT-GARDE IP LLC, Lorton, VA (US)

(72) Inventor: Ramraj Soundararajan, Lorton, VA (US)

(73) Assignee: AVANT-GARDE IP LLC, Lorton, VA (US)

( * ) Notice: Subject to any disclaimer, the term of this patent is extended or adjusted under 35 U.S.C. 154(b) by 8 days.

(21) Appl. No.: 16/030,847

(22) Filed: Jul. 9, 2018

(65) Prior Publication Data
US 2018/0322492 A1 Nov. 8, 2018

Related U.S. Application Data

(63) Continuation of application No. 13/896,319, filed on May 16, 2013, now Pat. No. 10,019,710.

(51) Int. Cl.
G06Q 20/40 (2012.01)
G06Q 20/20 (2012.01)
(Continued)

(52) U.S. Cl.
CPC .......... G06Q 20/40 (2013.01); G06Q 20/20 (2013.01); G06Q 20/322 (2013.01);
(Continued)

(58) Field of Classification Search
USPC .......................................................... 705/16
See application file for complete search history.

(56) References Cited

U.S. PATENT DOCUMENTS 8,156,128 B2* 4/2012 Ramer ............... G06Q 30/0255
707/748
8,230,016 B1 7/2012 Pattan et al.
(Continued)

FOREIGN PATENT DOCUMENTS

EP 2428906 A1 3/2012
GB 2491220 A 11/2012
(Continued)

OTHER PUBLICATIONS

S. Aguinaga et al., "Method for Privacy-Protecting Display and Exchange of Emergency Information on Mobiles Devices," 2012 International Conference on Collaboration Technologies and Systems (CTS), May 21-25, 2012, Denver, CO, 4pgs.
(Continued)

Primary Examiner — Garcia Ade
(74) Attorney, Agent, or Firm — IP Authority, LLC

(57) ABSTRACT

A method is described as implemented in a mobile device having a lock screen wallpaper, where, when the mobile device is at a business location, a user of the mobile device is authenticated non-invasively (e.g., utilizing the camera of the mobile device, using facial recognition, utilizing the camera of the mobile device and authenticating via facial recognition, etc.). Upon successful authentication, a scanning code is displayed over a lock screen wallpaper of the mobile device, where power is conserved in the mobile device by providing the scanning code without having to unlock the mobile device.

20 Claims, 8 Drawing Sheets

(51) Int. Cl.
  *G06Q 20/32* (2012.01)
  *G06Q 20/42* (2012.01)
(52) U.S. Cl.
  CPC ..... *G06Q 20/3274* (2013.01); *G06Q 20/3278* (2013.01); *G06Q 20/40145* (2013.01)

(56) References Cited

U.S. PATENT DOCUMENTS

| | | | |
|---|---|---|---|
| 8,412,158 | B2 | 4/2013 | Forutanpour et al. |
| 8,660,965 | B1 | 2/2014 | Bickerstaff |
| 8,666,895 | B2* | 3/2014 | Grigg .................. G06Q 20/36 705/44 |
| 8,668,492 | B2 | 3/2014 | Carroll |
| 8,676,273 | B1* | 3/2014 | Fujisaki .............. H04M 1/0202 455/567 |
| 8,688,492 | B2* | 4/2014 | Kruglick ............... G06Q 30/02 705/7.11 |
| 8,910,274 | B2 | 12/2014 | Sanders |
| 8,914,875 | B2 | 12/2014 | Matus |
| 2004/0267663 | A1 | 12/2004 | Karns |
| 2006/0160617 | A1 | 7/2006 | Hansen et al. |
| 2007/0300063 | A1 | 12/2007 | Adams |
| 2008/0248815 | A1 | 10/2008 | Busch |
| 2009/0119527 | A1* | 5/2009 | Kim ..................... G06F 1/3203 713/323 |
| 2009/0201126 | A1 | 8/2009 | Ikeguchi |
| 2009/0307139 | A1 | 12/2009 | Mardikar |
| 2010/0125509 | A1 | 5/2010 | Kranzley |
| 2010/0330953 | A1 | 12/2010 | Rogel |
| 2011/0251910 | A1 | 10/2011 | Dimmick |
| 2012/0011561 | A1 | 1/2012 | Courtney et al. |
| 2012/0054046 | A1 | 3/2012 | Albisu |
| 2012/0060123 | A1 | 3/2012 | Smith |
| 2012/0095911 | A1* | 4/2012 | Ibasco ................ G06Q 20/3255 705/39 |
| 2012/0185066 | A1 | 7/2012 | Kern et al. |
| 2012/0185398 | A1 | 7/2012 | Weis |
| 2012/0197743 | A1 | 8/2012 | Grigg et al. |
| 2012/0223890 | A1 | 9/2012 | Borovsky et al. |
| 2012/0233571 | A1 | 9/2012 | Wever |
| 2013/0031623 | A1 | 1/2013 | Sanders |
| 2013/0050250 | A1* | 2/2013 | Brinda ............... H04M 1/72544 345/619 |
| 2013/0069962 | A1* | 3/2013 | Nealer ............... H04M 1/72544 345/522 |
| 2013/0080964 | A1 | 3/2013 | Shigeta |
| 2013/0110678 | A1 | 5/2013 | Vigier et al. |
| 2013/0256403 | A1* | 10/2013 | MacKinnon Keith ................. G06Q 20/42 235/375 |
| 2013/0282193 | A1* | 10/2013 | Tyagi ..................... H02J 3/008 700/291 |
| 2014/0033273 | A1 | 1/2014 | Rathbun |
| 2014/0040035 | A1 | 2/2014 | Cusack |
| 2014/0058862 | A1 | 2/2014 | Celkonas |
| 2014/0189578 | A1 | 7/2014 | Shuttleworth et al. |
| 2014/0244507 | A1 | 8/2014 | Udd |
| 2014/0267064 | A1 | 9/2014 | Lu |
| 2014/0289683 | A1 | 9/2014 | Park |
| 2014/0304280 | A1 | 10/2014 | Oursbourn |
| 2014/0310174 | A1 | 10/2014 | Heeter |
| 2014/0323121 | A1 | 10/2014 | Kim et al. |
| 2018/0130548 | A1 | 5/2018 | Fisher |

FOREIGN PATENT DOCUMENTS

| | | |
|---|---|---|
| WO | 2012072808 A1 | 6/2012 |
| WO | 2013177391 A2 | 12/2012 |

OTHER PUBLICATIONS

A. Ajadaan et al., "QR-Codes for the Chronically Homeless," CHI 2008 Proceedings—Student Design Competition, Apr. 5-10, 2008, Florence, Italy, pp. 3879-3883.
"Apple buys into fingerprint recognition with AuthenTec deal," biometric Technology, Sep. 2012, 1pg.
L. Beighley, "Visual Quickstart Guide iPhone 5: Chapter 4: Using Your iPhone as a Phone," Peachpit Press, 31pgs.
T. Caldwell, "Locking down the e-wallet," Computer Fraud & Security, Apr. 2012, pp. 5-8.
A. Formiga et al., "An Assessment of Data Matrix Barcode Recognition under Scaling, Rotation and Cylindrical Warping," SACC'11, Mar. 21-25, 2011, TaiChung, Taiwan, pp. 266-267.
T. Hao et al., "COBRA: Color Barcode Streaming for Smartphone Systems," MobiSys'12, Jun. 25-29, 2012, Low Wood Bay, Lake District, UK, pp. 85-97.
T. Hao et al., "Demo: A Barcode Streaming System for Smartphones," MobiSys'12, Jun. 25-29, 2012, Low Wood Bay, Lake District, UK, p. 451.
R. Kemp, "Mobile payments: Current and emerging regulatory and contracting issues," Computer Law & Security Review, v29, 2013, pp. 175-179.
A. Kemshall, "Why mobile two-factor authentication makes sense," Network Security, Apr. 2011, pp. 9-12.
Y. Kristian et al., "Utilizing GPS and SMS for Tracking and Security Lock Application on Android Based Phone," Procedia—Social and Behavioral Sciences, v57, 2012, pp. 299-305.
R. Law, "Using Quick Response Codes for Student Interaction During Lectures," ITiCSE'12, Jul. 3-5, 2012, Haifa, Israel, p. 401.
P. Ljungstrand et al., "WebStickers: Using Physical Objects as WWW Bookmarks," CHI 99, May 15-20, 1999, pp. 332-333.
T. Rosa, "NFC on Mobile: On the Real Security of Mobile Payments," Cards 2012, Oct. 16-17, 2012, Prague, Czech Republic, 95 pgs.
T. Rosa, "Mobile Devices Security: On Practical Risks of NFC Payments," Mobile Payments 2012, Prague, Czech Republic, 51 pgs.
"Qualcomm Incorporated; Patent Issued for Mobile Device Having Increased Security That is Less Obtrusive," Computer Weekly News, 1676, Apr. 18, 2013, 3 pgs.

* cited by examiner

SYSTEM, METHOD, AND ARTICLE OF MANUFACTURE TO NON-INVASIVELY AUTHENTICATE AN AUTHORIZED USER OF A MOBILE DEVICE AND DISPLAYING A SCANNING CODE OVER A LOCK SCREEN WALLPAPER OF THE MOBILE DEVICE

RELATED APPLICATION

This application claims the benefit of U.S. application Ser. No. 13/896,319 filed May 16, 2013, pending.

FIELD OF INVENTION

The present invention relates generally to the field of mobile devices. More specifically, the present invention is related to a system, method, and article of manufacture to non-invasively authenticate an authorized user of a mobile device and displaying a scanning code over a lock screen wallpaper of the mobile device.

DISCUSSION OF RELATED ART

It is well known in the art to utilize a mobile device, such as a cellular phone, to conduct financial transactions. As an example, a mobile device can be used to pay for financial transaction at a retail establishment. One such example is discussed below to note some of the problems associated with the prior art in conducting such financial transactions.

A retail establishment, e.g., ABC Coffee Shop, may have a software (may also be called an application or app) that a user is able to download on his/her mobile device. Once the software is downloaded and installed by the user of the mobile device, the user can then power up/open the mobile device, click on an icon representative of the software, and run the software on the mobile device, which may display, as part of the running software, a scannable barcode. Users are, therefore, able to use the software installed on the mobile device to conduct a transaction at the retail establishment, which in this example is the ABC Coffee Shop, by having someone at the retail establishment scan the barcode, which allows the user to purchase an item (or items) that he/she desires to buy.

A problem with this scenario is that the user has to go through numerous steps in order to access the software and pay for a purchase, which starts by unlocking the phone, finding the right page having the icon representative of the desired software, clicking on the icon for the desired software, navigating within the software to the appropriate location to load up the barcode that may be used for payment, and presenting the barcode to the retail establishment. This process is time consuming and is also error-prone.

This problem is further compounded for users with numerous software applications that are currently installed on their mobile device, which makes it even more difficult and time consuming to locate and run the software. One mechanism provided for in various mobile devices is the ability to search for a software among the list of installed software. But, even this approach requires the user to unlock the phone, type the first few characters of the software name (if the user can remember the name) and find an appropriate match in the results for the software corresponding to the retail establishment, i.e., the ABC Coffee Shop, run the software, and navigate within the software to the appropriate portion of the software that deals with conducting a transaction. This process even more time consuming that the scenario discussed previously and is also error-prone.

Additionally, there is no non-intrusive way to authenticate the user as an authorized person to use the mobile device in such a financial transaction. The prior art provides intrusive mechanisms to verify a user's identity where, for example, a user may be asked to provide a pin code as an input prior to proceeding with a financial transaction.

Embodiments of the present invention are an improvement over prior art systems and methods.

SUMMARY OF THE INVENTION

In one embodiment, the present invention provides a method comprising: identifying a mobile device is at a business location; non-invasively authenticating, via facial recognition, a user of the mobile device as an authorized user of the mobile device, and upon successful authentication; displaying a scanning code over a lock screen wallpaper of the mobile device, the scanning code encoding payment information for conducting a transaction at the business location; and conserving power in the mobile device by providing the scanning code over the lock screen wallpaper of the mobile device, without having to unlock the mobile device.

In another embodiment, the present invention provides a method comprising: identifying a mobile device is at a business location; non-invasively authenticating, via a camera in the mobile device, a user of the mobile device as an authorized user of the mobile device, and upon successful authentication; displaying a scanning code over a lock screen wallpaper of the mobile device, the scanning code encoding payment information for conducting a transaction at the business location; and conserving power in the mobile device by providing the scanning code over the lock screen wallpaper of the mobile device, without having to unlock the mobile device.

In yet another embodiment, the present invention provides a method comprising: identifying a mobile device is at a business location; utilizing a camera in the mobile device and non-invasively authenticating, via facial recognition, a user of the mobile device as an authorized user of the mobile device, and upon successful authentication; displaying a scanning code over a lock screen wallpaper of the mobile device, the scanning code encoding payment information for conducting a transaction at the business location; and conserving power in the mobile device by providing the scanning code over the lock screen wallpaper of the mobile device, without having to unlock the mobile device.

In another embodiment, the present invention provides a mobile device comprising: a processor; a display; storage storing computer readable programmable code, which when executed by the processor implements a method to conserve power in the mobile device having a lock screen wallpaper, the storage comprising computer readable program code to: identify a mobile device is at a business location; non-invasively authenticate, via facial recognition, a user of the mobile device as an authorized user of the mobile device, and upon successful authentication; display a scanning code over a lock screen wallpaper of the mobile device, the scanning code encoding payment information for conducting a transaction at the business location; and conserve power in the mobile device by providing the scanning code over the lock screen wallpaper of the mobile device, without having to unlock the mobile device.

In yet another embodiment, the present invention provides a mobile device comprising: a processor; a display;

storage storing computer readable programmable code, which when executed by the processor implements a method to conserve power in the mobile device having a lock screen wallpaper, the storage comprising computer readable program code to: identify a mobile device is at a business location; non-invasively authenticate, via a camera in the mobile device, a user of the mobile device as an authorized user of the mobile device, and upon successful authentication; display a scanning code over a lock screen wallpaper of the mobile device, the scanning code encoding payment information for conducting a transaction at the business location; and conserve power in the mobile device by providing the scanning code over the lock screen wallpaper of the mobile device, without having to unlock the mobile device.

In another embodiment, the present invention provides a mobile device comprising: a processor; a display; storage storing computer readable programmable code, which when executed by the processor implements a method to conserve power in the mobile device having a lock screen wallpaper, the storage comprising computer readable program code to: identify a mobile device is at a business location; utilize a camera in the mobile device and non-invasively authenticate, via facial recognition, a user of the mobile device as an authorized user of the mobile device, and upon successful authentication; display a scanning code over a lock screen wallpaper of the mobile device, the scanning code encoding payment information for conducting a transaction at the business location; and conserve power in the mobile device by providing the scanning code over the lock screen wallpaper of the mobile device, without having to unlock the mobile device.

In one embodiment, the present invention provides an article of manufacture having non-transitory computer readable program code executable by a processor in a mobile device, the non-transitory computer readable storage medium comprising: computer readable program code identifying a mobile device is at a business location; computer readable program code non-invasively authenticating, via facial recognition, a user of the mobile device as an authorized user of the mobile device, and upon successful authentication; computer readable program code displaying a scanning code over a lock screen wallpaper of the mobile device, the scanning code encoding payment information for conducting a transaction at the business location; and computer readable program code conserving power in the mobile device by providing the scanning code over the lock screen wallpaper of the mobile device, without having to unlock the mobile device.

In another embodiment, the present invention provides an article of manufacture having non-transitory computer readable program code executable by a processor in a mobile device, the non-transitory computer readable storage medium comprising: computer readable program code identifying a mobile device is at a business location; computer readable program code non-invasively authenticating, via a camera in the mobile device, a user of the mobile device as an authorized user of the mobile device, and upon successful authentication; computer readable program code displaying a scanning code over a lock screen wallpaper of the mobile device, the scanning code encoding payment information for conducting a transaction at the business location; and computer readable program code conserving power in the mobile device by providing the scanning code over the lock screen wallpaper of the mobile device, without having to unlock the mobile device.

In yet another embodiment, the present invention provides an article of manufacture having non-transitory computer readable program code executable by a processor in a mobile device, the non-transitory computer readable storage medium comprising: computer readable program code identifying a mobile device is at a business location; computer readable program code utilizing a camera in the mobile device and non-invasively authenticating, via facial recognition, a user of the mobile device as an authorized user of the mobile device, and upon successful authentication; computer readable program code displaying a scanning code over a lock screen wallpaper of the mobile device, the scanning code encoding payment information for conducting a transaction at the business location; and computer readable program code conserving power in the mobile device by providing the scanning code over the lock screen wallpaper of the mobile device, without having to unlock the mobile device.

DESCRIPTION OF THE PREFERRED EMBODIMENTS

Figure 1:
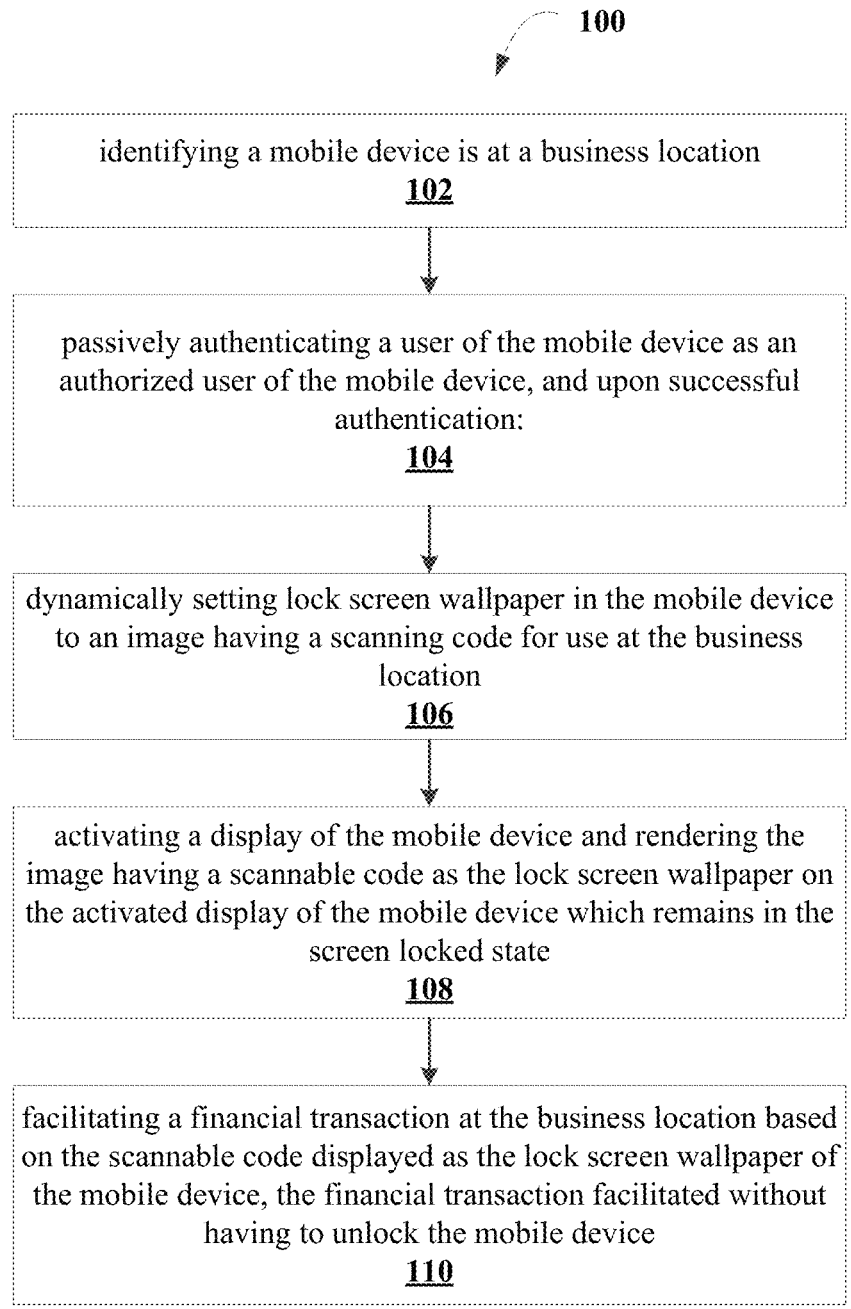
FIG. 1 illustrates an embodiment of the present invention to facilitate a financial transaction without unlocking a mobile device.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

FIG. 1 illustrates an embodiment of the present invention which discloses method 100 to facilitate a financial transaction without unlocking a mobile device. In step 102, the mobile device is identified to be at a business location. In one embodiment, the mobile device is identified as being located at the business location based on GPS data received at the mobile device. In another embodiment, the mobile device is identified as being located at the business location based upon a near field communication (NFC) interaction with a device at the business location. For example, the device at the business location may be a NFC tag and the mobile device may interact with such a NFC tag to confirm that it is located at a particular business location. In yet another extended embodiment, the NFC tag is either integrated into a point-of-sale terminal or is attached to a point-of-sale terminal at the business location.

In another embodiment, the mobile device is identified as being located at the business location based on a RFID interaction with a device at the business location. For example, the device at the business location may be a RFID tag and the mobile device may interact with such a RFID tag to confirm that it is located at a particular business location. In yet another extended embodiment, the RFID tag is either integrated into a point-of-sale terminal or is attached to a point-of-sale terminal at the business location.

In yet another embodiment the mobile device is identified as being located at the business location based on a Bluetooth interaction with a device at the business location. For example, the device at the business location may be a point-of-sale terminal that can communicate via Bluetooth with the mobile device.

In step 104, the mobile device passively authenticates a user as an authorized user of the mobile device. It is important to note that in the preferred embodiment, the authentication of the user is done in a non-invasive manner, where the user is unaware that such an authentication is taking place. Such non-invasive techniques include fingerprint recognition when the user places their hand on the screen, where such fingerprint recognition is done without the knowledge of the user, facial recognition where such facial recognition is done without the knowledge of the user, retinal authentication where such retinal authentication is done without the knowledge of the user, authentication based on identifying the presence of another electronic device (e.g., another tablet, mobile device, etc.) which is also associated with the same user, or accessing a profile and authenticating said user as an authorized user when there is a match between a current time (they are at the business location) and a past time in said profile (when the same user has visited the same business location in the past). It should further be noted that while there is always a primary user associated with a mobile device, there may also be secondary users associated with the same mobile device. For example, the same mobile device may be used by a husband and wife, son or daughter, as the primary user may authorize such secondary users to be authorized users of the mobile device. A user of the mobile device may maintain a profile and corresponding passive recognition data to identify a plurality of such authorized users of the same mobile device.

Upon successfully authenticating an authorized user, in step 106, a processor in the mobile device dynamically sets a lock screen wallpaper in the mobile device to an image having a scanning code (e.g., a QR code, a barcode, etc.) for use at the business location the user is at. It is important to note that the lock screen wallpaper, which is displayed when the mobile device is in a locked state to conserve power, is updated, and not the home screen wallpaper, which is generally displayed when a mobile device is not in a locked state.

Figure 4:
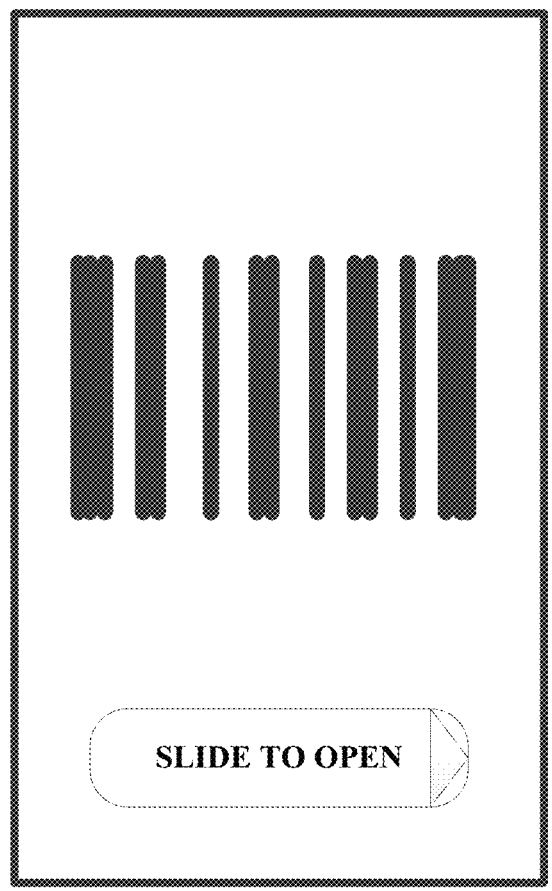
FIG. 4 depicts an example of such an image having the scannable code wherein the image is rendered as the lock screen wallpaper.

In step 108, a display of the mobile device is activated and the image having the scannable code is rendered as the lock screen wallpaper on the activated display of the mobile device which remains in the screen locked state. Such activation may be user initiated or triggered automatically (e.g., when the mobile device is proximate to a point of sale terminal). FIG. 4 depicts an example of such an image having the scannable code wherein the image is rendered as the lock screen wallpaper.

In step 110, a financial transaction is facilitated at the business location based on the scannable code displayed as the lock screen wallpaper of the mobile device, wherein such a financial transaction is facilitated without having to unlock the mobile device. For example, the attendant at the point of sale terminal may scan the scannable code displayed as the lock screen wallpaper of the mobile device and a financial transaction could be completed at the point of sale terminal for an item (or items) the user may wish to purchase at the business location.

Figure 5:
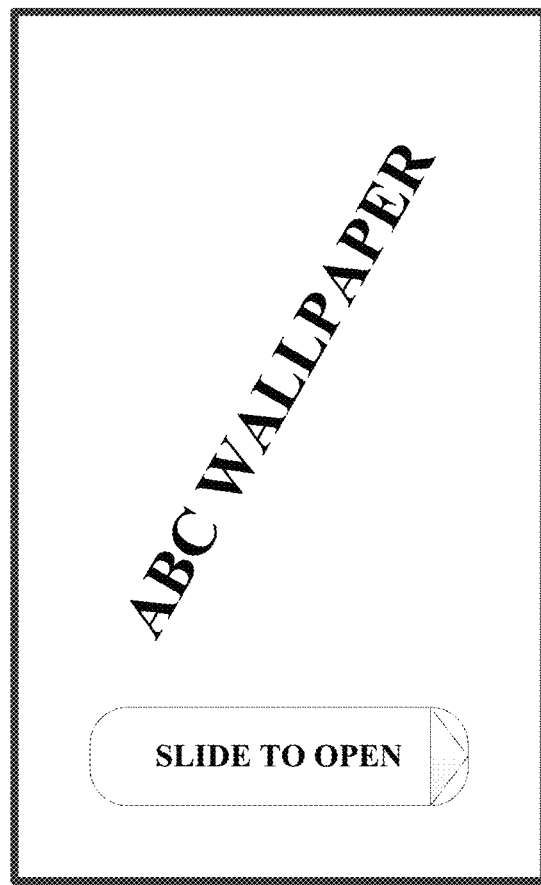
FIG. 5 depicts an example of a default lock screen wallpaper.
Figure 6:
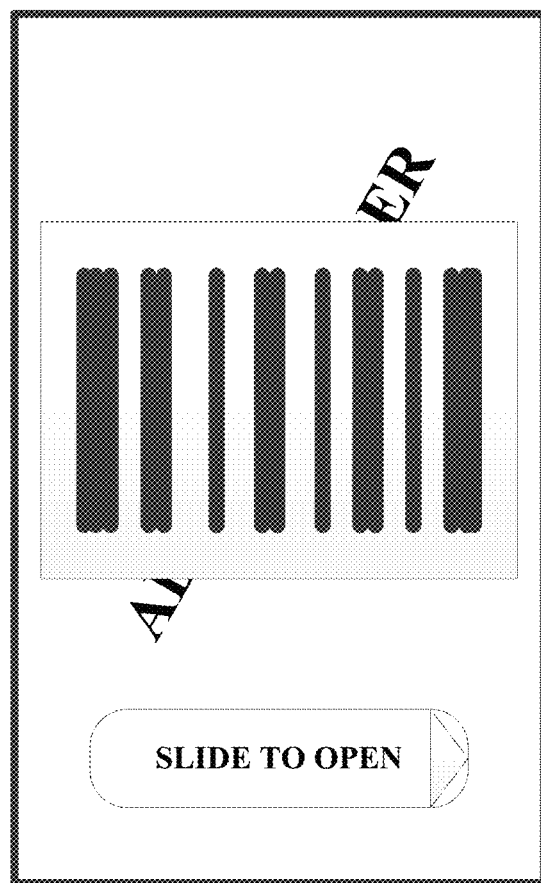
FIG. 6 depicts an example where the image having the scanning code is centered and partially covers the default lock screen wallpaper of FIG. 5.

In an alternative embodiment, the image having a scanning code (e.g., a QR code, a barcode, etc.) may be rendered in front of a default lock screen wallpaper (where it visually covers the entirety of the default lock screen wallpaper and looks like FIG. 4) or in front of a portion of the default lock screen wallpaper (see FIG. 5 for an example of a default lock screen wallpaper, and FIG. 6 for an example where the image having the scanning code is centered and partially covers the default lock screen wallpaper), where the default lock screen wallpaper is either a custom image previously set by the user of the mobile device or is the system default of the mobile device (the system default image for the lock screen wallpaper when the user has not previously set the lock screen wallpaper to a custom image). The point of sale terminal is able to scan the scannable code to complete a purchase at the business location.

In one embodiment, the method further comprises reverting the lock screen wallpaper to a default lock screen wallpaper (i.e., a lock screen wallpaper previously set by a user) upon either a successful completion of the financial transaction or upon the user leaving the premises of the business location.

In one embodiment, the financial transaction is associated with a financial account (e.g., an account associated with a credit card account, a gift card, a credit account associated with the business, etc.) and the method further comprises updating the lock screen wallpaper to another image showing a balance left on the financial account after successful completion of the financial transaction. After displaying the image showing the balance as the lock screen wallpaper, the mobile device may revert to a default lock screen wallpaper (i.e., a lock screen wallpaper previously set by a user) upon either the expiration of a pre-determined time (e.g., a few seconds after the display of the image showing the balance) or upon the user leaving the premises of the business location.

Figure 7:
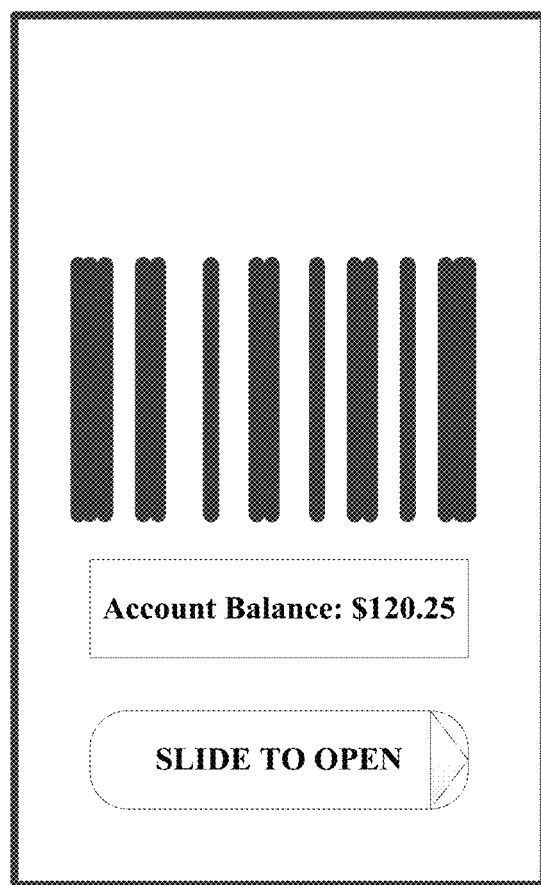
FIG. 7 depicts an example of an image showing the scanning code and an account balance.

In one embodiment, the image having a scanning code for use at the business additionally displays a balance associated with a financial account which is used during the financial transaction. Such an example is shown in FIG. 7 which depicts the scanning code and the balance as part of the lock screen image.

Figure 8:
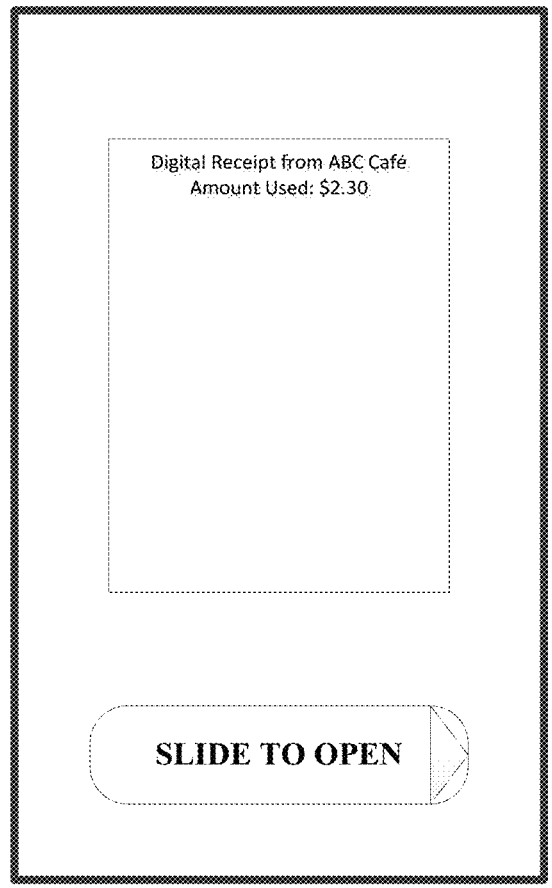
FIG. 8 depicts an example of a digital receipt shown as part of the lock screen background.

In one embodiment, after successful completion of the financial transaction, the lock screen wallpaper is updated to display a digital receipt as new lock screen wallpaper. Such an example is shown in FIG. 8. The digital receipt image may be received from a device at the business location like a point of sale terminal or may be received over a network such as the Internet or via the cellular network. After displaying the image showing the digital receipt as the lock screen wallpaper, the mobile device may revert to a default lock screen wallpaper (i.e., a lock screen wallpaper previously set by a user) upon either the expiration of another pre-determined time (e.g., a few seconds after the display of the image showing the digital receipt) or upon the user leaving the premises of the business location.

In one embodiment, the scannable code comprises user-defined customization data related to the financial transaction in addition to information required to perform the financial transaction. For example, the user may have previously stored data identifying order details associated with a drink (e.g., type of drink—coffee/espresso/cappuccino, syrup additives, number of pumps of syrup additives, type of milk to be used to make drink, etc.) or order details associated with a food item (type of toppings on a pizza, requested condiments, etc.) and this previously stored information regarding the order details may be encoded into the scannable code (at either the request of the user or is automatically identified via a profile storing what was previously ordered at the business location and is presented to the user for verification prior to being encoded as the scannable code), where the point of sale terminal may decode this information and the attendant at the point of sale terminal can review the order details. Such order details that may be encoded along with information required to perform a financial transaction may be useful in getting an order correct as it is directly from the user and is not based on the attendant at the point of sale terminal inputting such data, which by definition is error prone.

In one embodiment, the financial transaction is a cloud-based transaction, wherein a payment provider automatically covers the cost of a purchase with issuer linked funds and, in a separate transaction, the payment provider charging the purchaser's selected, cloud-linked account in a card-not-present environment to recoup its losses on the first transaction.

In one embodiment, the image having a scanning code for use at the business location is generated by a software running on the mobile device, wherein the software is associated with the business location.

Non-limiting examples of the mobile device include any of the following: a mobile phone, a tablet, a portable gaming device or a digital music player.

Figure 2:
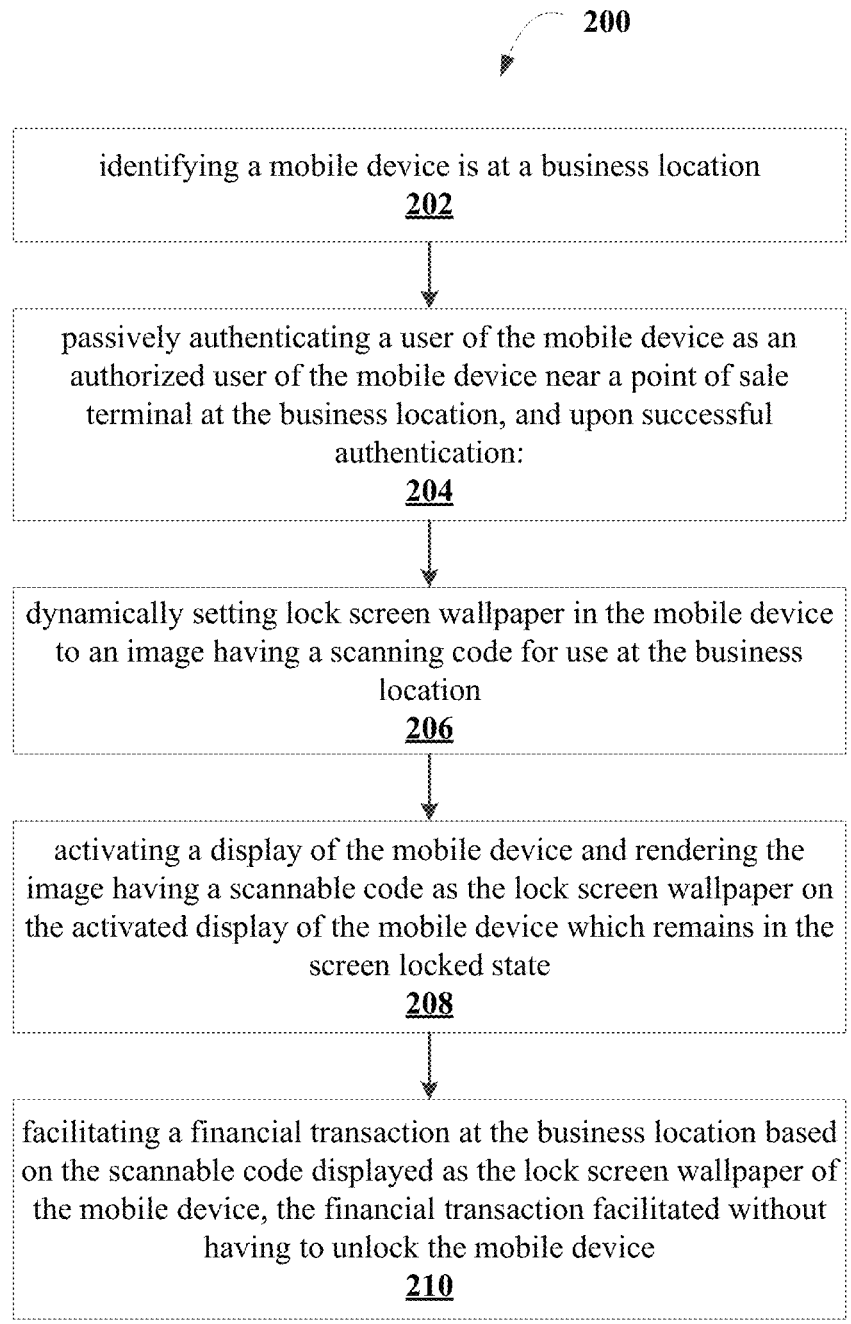
FIG. 2 illustrates another embodiment of the present invention to facilitate a financial transaction without unlocking a mobile device.

FIG. 2 illustrates another embodiment of the present invention's method to facilitate a financial transaction without unlocking a mobile device, wherein the method comprises the steps of: identifying the mobile device is at a business location (step 202); passively authenticating a user of the mobile device as an authorized user of the mobile device near a point of sale terminal at the business location (step 204), and upon successful authentication: dynamically setting lock screen wallpaper in the mobile device to an image having a scanning code for use at the business location (step 206); activating a display of the mobile device and rendering the image having a scannable code as the lock screen wallpaper on the activated display of the mobile device which remains in the screen locked state (step 208); and facilitating a financial transaction at the business location based on the scannable code displayed as the lock screen wallpaper of the mobile device, the financial transaction facilitated without having to unlock the mobile device (step 210).

The above-presented discussion with regards to FIG. 1 applies to FIG. 2, but it should be noted that in this embodiment, the passive authentication is done while the user is near the point of sale terminal at the business location.

Figure 3:
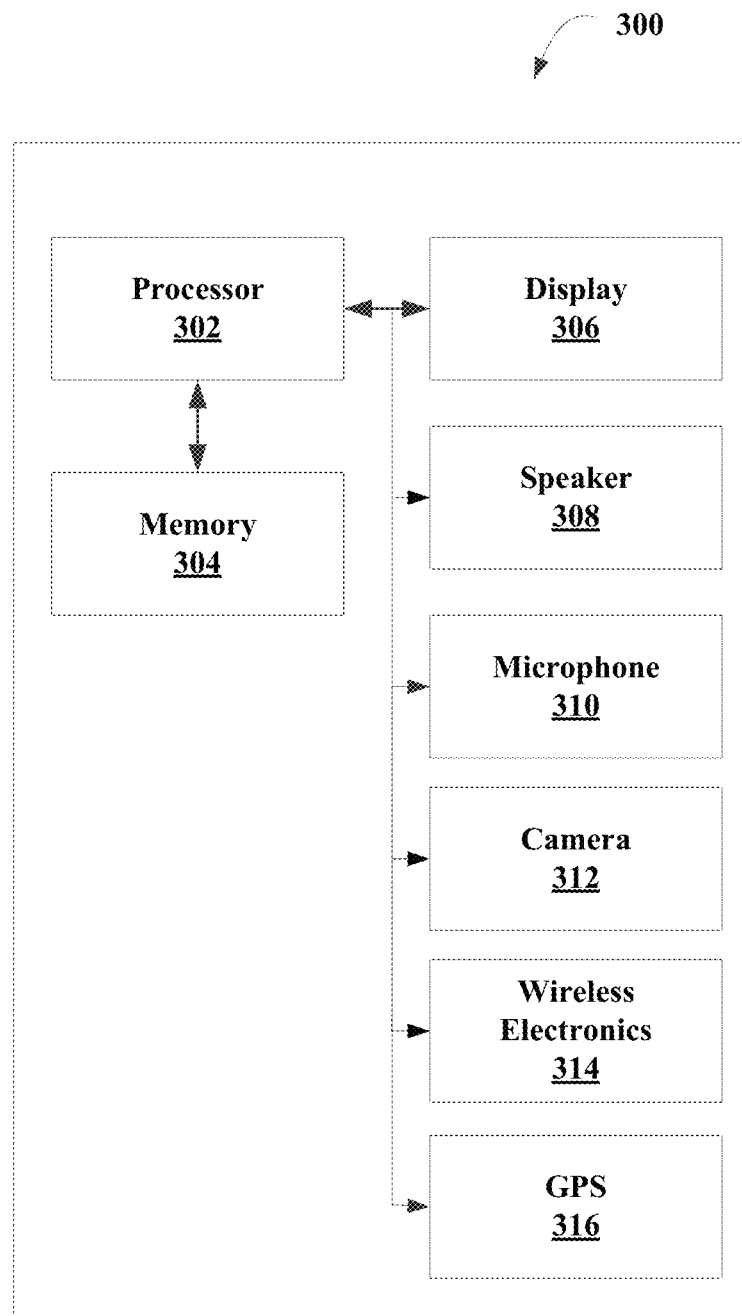
FIG. 3 depicts a non-limiting example of a mobile device according to the present invention.

FIG. 3 depicts a non-limiting example of a mobile device 300 according to the present invention. While select components (processor 302 memory 304, display 306 (e.g. a touch screen display), speaker 308, microphone 310, camera 312, wireless electronics 314 required for wireless communication, GPS unit 316) are shown as being part of the mobile device 300, it should be noted that these components are provided as a simplistic case scenario and other known components (such as, but not limited to, a Bluetooth module, a NFC module, a RFID module), may be present within the mobile device 300. Mobile device 300 comprises: a processor 302; a display 306; and memory/storage 304 storing computer readable programmable code, which when executed by the processor implements a method to facilitate a financial transaction without unlocking a mobile device, the memory/storage 304 comprising computer readable program code to: identify the mobile device 300 is at a business location (using for example, GPS 316); passively authenticate a user of the mobile device 300 as an authorized user of the mobile device (using, for example, camera 312 to passively conduct facial recognition or using touch screen display 306 to passively conduct fingerprint recognition or passively inspecting a profile stored in memory 304 or a profile stored at a network location which is downloaded to memory 304 to identify if the user has been to the business location at about the same time in the past), and upon successful authentication: dynamically set lock screen wallpaper in the mobile device 300 to an image having a scanning code for use at the business location; activate the display 306 of the mobile device 300 and render the image having a scannable code as the lock screen wallpaper on the activated display 306 of the mobile device 300 which remains in the screen locked state; and facilitate a financial transaction at the business location based on the scannable code displayed as the lock screen wallpaper of the mobile device 300, the financial transaction facilitated without having to unlock the mobile device 300. It should be noted that the mobile device may include any of the following: a mobile phone, a tablet, a portable gaming device or a digital music player.

Additionally, the present invention provides for an article of manufacture comprising computer readable program code contained within implementing one or more modules to facilitate a financial transaction without unlocking a mobile device. Furthermore, the present invention includes a computer program code-based product, which is a storage medium having program code stored therein which can be used to instruct a computer/processor to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

The present invention also provides for an article of manufacture having non-transitory computer readable storage medium comprising computer readable program code executable by a processor to implement a method to facilitate a financial transaction without unlocking a mobile device, the non-transitory computer readable storage medium comprising: computer readable program code identifying the mobile device is at a business location; computer readable program code passively authenticating a user of the mobile device as an authorized user of the mobile device, and upon successful authentication: computer readable program code dynamically setting lock screen wallpaper in the mobile device to an image having a scanning code (e.g., a QR code, a barcode, etc.) for use at the business location; computer readable program code activating a display of the mobile device and rendering the image having a scannable code as the lock screen wallpaper on the activated display of the mobile device which remains in the screen locked state; and computer readable program code facilitating a financial transaction at the business location based on the scannable code displayed as the lock screen wallpaper of the mobile device, the financial transaction facilitated without having to unlock the mobile device.

CONCLUSION

A system, method and article of manufacture has been shown in the above embodiments for the effective implementation of a system, method and article of manufacture to non-invasively authenticate an authorized user of a mobile device and displaying a scanning code over a lock screen wallpaper of the mobile device. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, mobile environment, specific computing hardware, or specific mobile hardware.

The invention claimed is:

1. A method comprising:
   (a) identifying a mobile device is at a business location;
   (b) non-invasively authenticating, via facial recognition, a user of the mobile device as an authorized user of the mobile device, and upon successful authentication;
   (c) displaying a scanning code over a lock screen wallpaper of the mobile device, the scanning code encoding payment information for conducting a transaction at the business location; and
   (d) conserving power in the mobile device by providing the scanning code over the lock screen wallpaper of the mobile device, without having to unlock the mobile device.

2. The method of claim 1, wherein the scanning code is a QR code.

3. The method of claim 1, wherein the scanning code is a barcode.

4. The method of claim 1, wherein the step of displaying a scanning code over the lock screen wallpaper comprises the step of displaying the scanning code over a portion of the lock screen wallpaper.

5. The method of claim 1, wherein the non-invasively authenticating step (b) comprises utilizing a camera in the mobile device to non-invasively perform the facial recognition to authenticate the user of the mobile device as an authorized user of the mobile device.

6. The method of claim 1, wherein the transaction is a cloud-based, card-not-present, transaction at the business location.

7. The method of claim 6, in the cloud-based, card-not-present transaction, a payment provider automatically covers transaction cost with issuer linked funds and, in a separate transaction, the payment provider charging purchaser's selected, cloud-linked account in a card-not-present transaction.

8. The method of claim 1, wherein the method further comprises receiving an indication of a completion of a transaction based on the scanning code and, upon receiving the indication, displaying over the lock screen wallpaper a balance left on an account associated with the scanning code.

9. The method of claim 1, wherein the step of identifying the mobile device is at the business location is based on GPS data.

10. The method of claim 1, wherein the step of identifying the mobile device is at the business location is based upon any of the following interactions with a device at the business location: (a) a near field communication (NFC) interaction, (b) an RFID interaction, or (c) a Bluetooth interaction.

11. The method of claim 1, wherein the mobile device is any of the following: a mobile phone, a tablet, a portable gaming device or a digital music player.

12. The method of claim 1, wherein the scanning code encodes user defined customization data in addition to the payment information.

13. The method of claim 1 further comprising facilitating a transaction at the business location based on the scanning code displayed over the lock screen wallpaper when the mobile device remains in the screen locked state without unlocking the mobile device.

14. A method comprising:
   (a) identifying a mobile device is at a business location;
   (b) non-invasively authenticating, via a camera in the mobile device, a user of the mobile device as an authorized user of the mobile device, and upon successful authentication;
   (c) displaying a scanning code over a lock screen wallpaper of the mobile device, the scanning code encoding payment information for conducting a transaction at the business location; and
   (d) conserving power in the mobile device by providing the scanning code over the lock screen wallpaper of the mobile device, without having to unlock the mobile device.

15. The method of claim 14, wherein the scanning code is a QR code.

16. The method of claim 14, wherein the scanning code is a barcode.

17. The method of claim 14, wherein the step of displaying a scanning code over the lock screen wallpaper comprises the step of displaying the scanning code over a portion of the lock screen wallpaper.

18. The method of claim 14, wherein the non-invasively authenticating step (b) comprises utilizing the camera in the mobile device to non-invasively perform facial recognition to authenticate the user of the mobile device as an authorized user of the mobile device.

19. The method of claim 14, wherein the transaction is a cloud-based, card-not-present, transaction at the business location.

20. A method comprising:
   (a) identifying a mobile device is at a business location;
   (b) utilizing a camera in the mobile device and non-invasively authenticating, via facial recognition, a user of the mobile device as an authorized user of the mobile device, and upon successful authentication;
   (c) displaying a scanning code over a lock screen wallpaper of the mobile device, the scanning code encoding payment information for conducting a transaction at the business location; and
   (d) conserving power in the mobile device by providing the scanning code over the lock screen wallpaper of the mobile device, without having to unlock the mobile device.

* * * * *